United States Patent
Pintal et al.

(10) Patent No.: US 9,582,732 B2
(45) Date of Patent: Feb. 28, 2017

(54) METHOD AND APPARATUS FOR TOMOGRAPHY IMAGING

(71) Applicant: CANON KABUSHIKI KAISHA, Tokyo (JP)

(72) Inventors: Lukasz Pintal, Wleń (PL); Krzysztof Piotrowski, Wrocław (PL); Michal Popek, Otmuchów (PL); Wojciech Sura, Wrocław (PL); Kamil Zukowski, Sokółka (PL)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 13/953,291

(22) Filed: Jul. 29, 2013

(65) Prior Publication Data
US 2014/0029825 A1 Jan. 30, 2014

(30) Foreign Application Priority Data
Jul. 30, 2012 (EP) .................... 12178557

(51) Int. Cl.
*G06K 9/00* (2006.01)
*G06K 9/46* (2006.01)
*G06T 7/00* (2006.01)

(52) U.S. Cl.
CPC .......... *G06K 9/4671* (2013.01); *G06T 7/0097* (2013.01); *G06T 2207/10101* (2013.01);
(Continued)

(58) Field of Classification Search
CPC ... G01B 9/02091; A61B 5/0066; A61B 5/102; A61B 5/14; G06T 2207/10101; G06T 2207/30041; G06T 7/0097; G06K 9/4671
See application file for complete search history.

(56) References Cited

U.S. PATENT DOCUMENTS 8,602,556 B2 * 12/2013 Imamura ............... A61B 3/1241
351/206
8,801,187 B1 * 8/2014 Knighton ............... A61B 3/102
345/418
(Continued)

FOREIGN PATENT DOCUMENTS

CN 101400295 A 4/2009
CN 101896114 A 11/2010
(Continued)

OTHER PUBLICATIONS

Abramoff et al.,"Retinal Imaging and Image Analysis", IEEE Reviews in Biomedical Engineering, 2010, pp. 169-208, vol. 3.
(Continued)

*Primary Examiner* — Aaron W Carter
(74) *Attorney, Agent, or Firm* — Canon USA Inc., IP Division

(57) ABSTRACT

A method and apparatus for determining the position of a feature of an object under test in a tomography image are disclosed. The method includes: determining characterizing points, in an additional image, of a feature of the object of interest; determining position data relating to the feature in the additional image based on the detected characterizing points; and identifying a feature of the object of interest in the tomography image. The determined position data in the additional image is used to guide the identification. A computer readable medium which may be non-transitory and upon execution by a processor configures a computer to perform the method is also disclosed.

20 Claims, 5 Drawing Sheets

(52) U.S. Cl.
CPC .............. *G06T 2207/20221* (2013.01); *G06T 2207/30041* (2013.01)

(56) References Cited

U.S. PATENT DOCUMENTS

| | | | | |
|---|---|---|---|---|
| 2007/0109499 | A1* | 5/2007 | Yan | A61B 3/12 351/221 |
| 2007/0195269 | A1* | 8/2007 | Wei | A61B 3/102 351/221 |
| 2007/0263227 | A1* | 11/2007 | Mujat | A61B 3/102 356/511 |
| 2008/0100612 | A1 | 5/2008 | Dastmalchi et al. | |
| 2009/0268159 | A1* | 10/2009 | Xu | A61B 3/102 351/206 |
| 2011/0080560 | A1* | 4/2011 | Imamura | A61B 3/102 351/206 |
| 2011/0137157 | A1* | 6/2011 | Imamura | G06T 7/0012 600/425 |
| 2011/0141259 | A1* | 6/2011 | Nakano | A61B 3/0025 348/78 |
| 2012/0050308 | A1 | 3/2012 | Nakano et al. | |
| 2012/0070049 | A1 | 3/2012 | Iwase et al. | |
| 2012/0130270 | A1* | 5/2012 | Imamura | G06T 7/0012 600/558 |
| 2012/0148130 | A1* | 6/2012 | Nakano | G06T 7/0081 382/131 |
| 2012/0213423 | A1* | 8/2012 | Xu | A61B 5/0073 382/131 |
| 2012/0218515 | A1* | 8/2012 | Imamura | A61B 3/12 351/206 |
| 2012/0328156 | A1* | 12/2012 | Nakano | G06T 7/0083 382/103 |
| 2013/0004046 | A1* | 1/2013 | Nakano | A61B 3/102 382/131 |
| 2014/0029794 | A1* | 1/2014 | Zukowski | G06T 7/2033 382/103 |
| 2014/0029825 | A1* | 1/2014 | Pintal | G06K 9/4671 382/131 |
| 2014/0029826 | A1* | 1/2014 | Pintal | G06T 11/008 382/131 |
| 2014/0063447 | A1* | 3/2014 | Piotrowski | A61B 3/102 351/206 |
| 2014/0152957 | A1* | 6/2014 | Reisman | G06T 7/0012 351/206 |
| 2015/0366452 | A1* | 12/2015 | Iwase | A61B 3/0025 351/206 |

FOREIGN PATENT DOCUMENTS

| | | |
|---|---|---|
| CN | 102479385 A | 5/2012 |
| JP | 2010035607 A | 2/2010 |

OTHER PUBLICATIONS

Antony et al.,"Automated 3-D Segmentation of Intraretinal Layers From Optic Nerve Head Optical Coherence Tomography Images", Proc. of SPIE, pp. 76260U-1 to 76260U-12, vol. 7626.

Abramoff et al.,"Automated Segmentation of the Cup and Rim from Spectral Domain OCT of the Optic Nerve Head", Investigative Ophthalmology & Visual Science, Dec. 2009, pp. 5778-5784, vol. 50, No. 12.

European Search Report for Application No. EP 07 71 6878.

* cited by examiner

METHOD AND APPARATUS FOR TOMOGRAPHY IMAGING

CROSS-REFERENCE TO RELATED APPLICATIONS

The present application claims priority under 35 U.S.C. §119 to European patent application No. EP12178557.0 filed on Jul. 30, 2012 in the European Patent Office. The disclosure of the above application is incorporated herein by reference in its entirety.

BACKGROUND OF THE INVENTION

Field of the Invention

The present invention relates to a method and apparatus for determining the position of a feature of an object under test in a tomography image in an imaging system using optical coherence tomography (OCT). In particular, but not exclusively, the invention relates to detecting boundaries between particular layers of an eye as well as some eye-specific features, such as the optic disc (blind spot) or the fovea centre during optical tomography data acquisition, especially OCT scans.

Optical Coherence Tomography (OCT) is a technique for performing high-resolution cross-sectional imaging that can provide images of tissue structure. OCT is a method of interferometry that determines a scattering profile of a sample in the direction of an OCT beam. Each scattering profile is called an axial scan, or an A-scan. A series of A-scans across the structure permits a cross-sectional reconstruction of a plane through the anterior or posterior segment of the tissue. This is known as a B-scan.

A layer segmentation and features identification (segmentation/features) algorithm that uses optical coherence tomography results (structural data) is an essential function provided by most commercially available OCT devices (e.g. SOCT Copernicus, Optopol; RS-3000, Nidek; October-2000, Topcon; Cirrus HD-OCT, Carl Zeiss Meditec).

The segmentation/features algorithm attempts to detect boundaries between particular layers as well as some eye-specific features, such as the optic disc (blind spot) or the fovea centre. In many cases it is possible to use a model of a healthy eye to perform accurate layer segmentation. However, this approach fails when imaging some pathologic eyes. There is a further drawback in known methods in that it is difficult to perform accurate layer segmentation and/or features detection on a single tomogram (i.e. a single B-scan taken in XZ or YZ plane, where the Z axis denotes the depth of the imaging sample). Such difficulties are due to lack of information about the position of the scanned area of a retina. In this case and in case of some pathologies, such as a hole in the retina, a false non-anatomical area may be recognized as an optic disc area.

In order to overcome the above disadvantages, additional information can be obtained by analyzing features of a fundus-like image (i.e. a projection image on the XY plane) reconstructed from 3D OCT data. The additional information about location of optic disc is very useful for improving the performance of the segmentation/features algorithm. The additional information can be used to determine the location of a single B-scan in relation to the location of optic disc and based on this information adjust and/or modify parameters of the segmentation algorithm. However, sometimes the disc detection on 3D OCT data volume cannot be performed because of one or more of the following reasons:

the quality of the tomograms in the vicinity of the disc is insufficient to perform successful detection;
the examination area does not include the optic disc; or
the examination area includes the optic disc but the detection is impossible due to low resolution of 3D data (e.g. small number of B-scans and/or A-scans).

There is, therefore, a need for an improved method for recognizing a location of B-scan in relation to some common feature of the retina, e.g. the optic disc. Thus, it is desirable to have a product or process that finds the location of the optic disc (or other feature of the retina) prior to segmentation processing.

SUMMARY OF THE INVENTION

In order to achieve the presented goals in a first aspect there is provided a method for identifying a feature of an object of interest in a tomography image, the method comprising:
 determining characterizing points, in an additional image, of a feature of the object of interest;
 determining position data relating to the feature in the additional image based on the detected characterizing points; and
 identifying a feature of the object of interest in the tomography image, wherein the determined position data in the additional image is used to guide the identification.

In one embodiment the feature in the tomography image and the feature in the additional image are the same feature of the object of interest.

Preferably, the additional image is not a tomography image. For example, the additional image could be obtained by imaging with a scanning laser ophthalmoscope, a fundus camera or other retina imaging device.

In one embodiment guiding the identification comprises correcting an initial identification of the feature.

Preferably guiding the identification comprises fitting the position data of the additional image to position data of the tomography image.

Advantageously, guiding the identification further comprises utilizing the fitted position data to determine a region of interest in the tomography image in which to search for the feature to be identified in the tomography image.

In one embodiment fitting the position data of the additional image to position data of the tomography image is performed by aligning the additional image and tomography image with use of an image fitting algorithm.

In another embodiment fitting the position data of the additional image to position data of the tomography image is performed by manually aligning the additional image with tomography image.

In yet another embodiment fitting the position data of the additional image to position data of the tomography image is performed by determining the relationship between the additional image and tomography image and using determined relationship to aligning the additional image with tomography image.

In another embodiment fitting the position data of the additional image to position data of the tomography image is performed by determining the relationship between hardware components, and using determined relationship to aligning the additional image with tomography image.

Advantageously, tomography image may be converted to a two-dimensional image.

Preferably, the object of interest is an eye and the feature relates to the optic disc of the retina in the eye.

In one embodiment, the feature related to optic disc is used to define area of correction of the thickness of layers of retina.

In another embodiment, the feature related to optic disc is used to define an area of converging layers of the retina.

In yet another embodiment, the feature related to optic disc is used to define area of removing false positive detections of tractions.

Advantageously, apparatus according the invention is adapted to perform the method for identifying a feature of an object of interest in a tomography image.

A computer readable medium according the invention preferably comprises instructions which upon execution cause a device perform the method for identifying a feature of an object of interest in a tomography image. The computer readable carrier medium may be non-transitory.

In a further aspect there is provided a method for processing a tomography image, the method comprising, identifying an optic disc in a tomography image, detecting a layer boundary in the tomography image; and, in the tomography image, converging the detected layer boundary to an end of a Retina Pigment Epithelium layer around the identified optic disc.

In one embodiment the detecting comprises detecting a plurality of layer boundaries, and converging comprises converging each detected layer boundary, except any boundary detected between a Vitreous and a Retina Nerve Fiber Layer, to an end of a Retina Pigment Epithelium layer around the identified optic disc.

In a yet further aspect there is provided a method for processing a tomography image, the method comprising, identifying an optic disc in a tomography image; and detecting a Retina Nerve Fiber Layer in the tomography image along a path that starts inside the identified optic disc and ends towards an edge of the tomography image.

Data gained with the method and apparatus according to present invention may be used to improve the results of further analyses, e.g. the position and shape of the disc and position of the fovea may be detected regardless of the OCT. The search area for the OCT optic disc detection algorithm may be reduced in order to improve the performance and quality of the results.

BRIEF DESCRIPTION OF THE DRAWINGS

Reference will now be made, by way of example, to the accompanying drawings, in which.

DESCRIPTION OF THE EMBODIMENTS

In a first embodiment an image of the retina is taken by a second imaging apparatus simultaneously with OCT data acquisition. In this embodiment the second imaging apparatus comprises a scanning laser ophthalmoscope (SLO) which obtains an image of the retina, but it is to be understood that the invention is not so limited. Any suitable imaging apparatus can be used that is suitable for obtaining an image of the feature of interest. For example, for retina imaging to identify the optic disc, a fundus camera or any other similar device suitable for retina imaging may be used.

The locations of specific features of the imaged retina are obtained based on the taken image.

Figure 1:
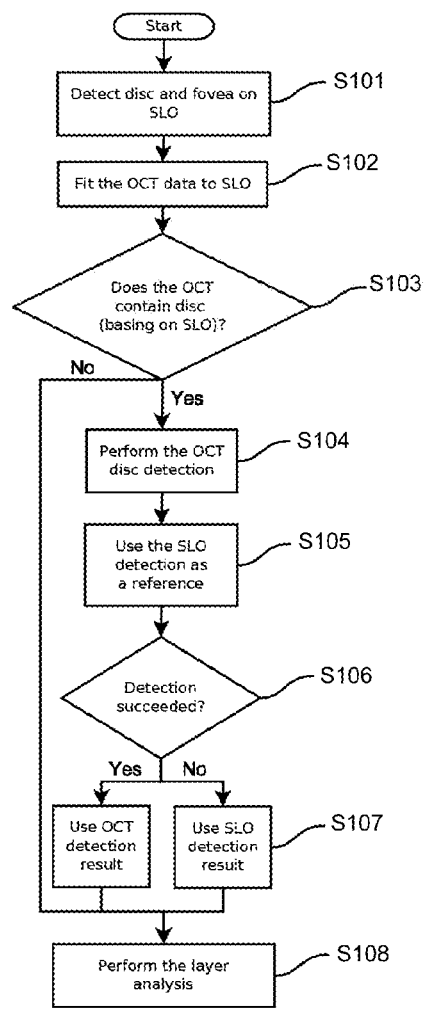
FIG. 1 shows a flow chart of the embodiment of the method according to the present invention, with SLO disc detection.

Referring to FIG. 1 a flowchart of an embodiment of the present invention is shown. In summary, firstly the optic disc position is detected on the additional image. This may be achieved by applying common image processing techniques, such as edge detection filters, transforms detecting circular regions etc.

This generates a set of data comprising the optic disc position, such as coordinates of the optic disc centre and a polygon denoting the optic disc boundaries.

Secondly, the additional image is aligned to the OCT scanning area, such that position of retina features visible on the additional image are aligned with the position of those elements on the OCT image. Such an operation may be performed by preparing a two-dimensional projection of the OCT data and using any suitable mathematical optimization technique to find a best fit of these two images. If such a best fit transformation is found, the data retrieved from the additional image is transformed to the space of OCT data, thus enabling its usage in OCT detection algorithms.

According to the preferred embodiment shown in FIG. 1, in step S101, the disc on retina image is detected by applying a series of image filters to enhance the image and remove noise (such as Gaussian blur or median. This is followed by using any algorithm designed to detect circular areas on the image, such as the Hough transform or a set of directional filters to detect disc edges. The result comprises coordinates of the centre of the determined optic disc along with a polygon describing the optic disc boundaries on the image of the retina.

In step S102 the coordinates determined in step S101 are fitted or translated to the OCT image space. The fitting process in step S102 from may be performed in one of the following ways:

By properly aligning the hardware components, such that relationship of retina image and OCT scanning area is known. The known geometric relationship between the hardware components can then be used to align both the SLO and OCT data sets;

By determining the relationship between the retina image and OCT data (e.g. a function depending on set of scanning parameters used in the one or both of the retina and OCT imaging) and performing specific calculations to align both data sets;

By aligning the retina image and OCT projection images using conventional image fitting algorithms;

By manually aligning the images (e.g. by projection the retina image and the OCT image on a display and having a user adjust parameters of one or other displayed image until they become aligned).

When the disc is detected on the retina image and the retina image is properly aligned with OCT data, it is possible to carry out step S103 and check, if the OCT contains the disc area. If so, the disc detection on the OCT image may be performed. Otherwise, all successive algorithms for feature detection may use the retina image disc detection as a reference during the layer detection.

Figure 3:
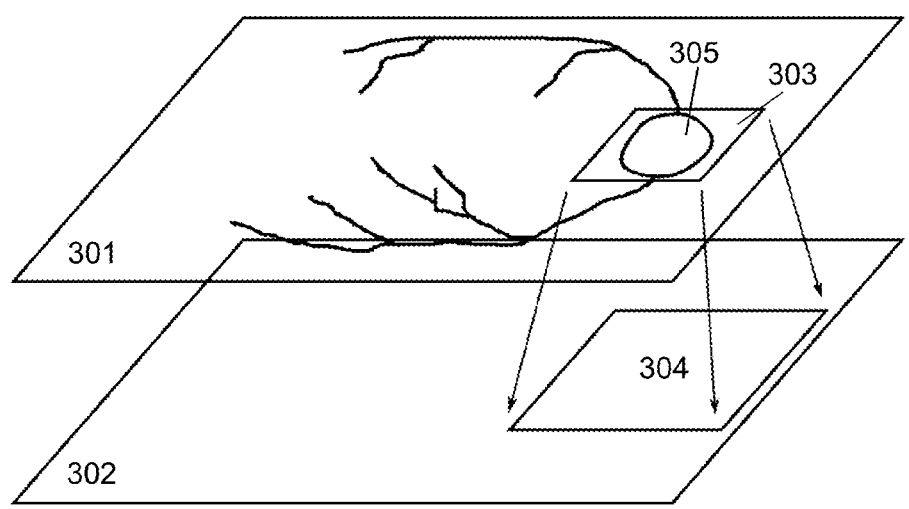
FIG. 3 illustrates the relationship between the OCT disc search area and fundus image, utilized in steps 4 and 5 from FIG. 1.

According to the preferred embodiment, the OCT data is converted to a two-dimensional image resembling the fundus image, namely the projection image. The disc detection on the projection image (steps S104 and S105 from FIG. 1)

may be carried out in a similar manner to detecting the disc on the retina image. However, disc detection on the retina image detection may be used in several ways to improve and simplify the OCT disc detection algorithm. For instance:

The AABB (axis-aligned bounding box) of retina image disc detection may be mapped into the OCT coordinate system to restrict the search area. This is illustrated in FIG. 3 which shows a retina image 301 on which the optic disc 305 has been imaged. A bounding box 303 bounding the detected optic disc feature in the retina image 301 is mapped or projected on to a corresponding area 304 of the OCT image data. The area in which the OCT detection algorithm searches for the optic disc is limited by projected bounding box region 303;

If the retina image detection indicates, that the optic disc lies on the edge of OCT data, the OCT disc detection algorithm may correspondingly adjust the disc position to reflect this;

The OCT detection algorithm may compare shape of a disc detected on the OCT image to the shape of the disc detected on the retina image. The correlation or similarity between the shapes provides a measure as to whether the recognition is reliable. For example, any mathematical operation for determining a correlation value could be used.

It is necessary to check at steps S106/S107, if the disc is detected in the OCT image. Due to pathologies, image artefacts or poor quality of OCT detection, the result of the OCT detection may not be good enough to use it in subsequent layer detection processes. In such a case, it is necessary to use the retina image detection result to preserve the possibility of using certain layer detection improvements.

Thus, after detecting the disc on SLO, the retrieved SLO position data may, for example, be used for at least the following purposes:

utilising the detected SLO disc position data in layer detection algorithms instead of the OCT detection if the latter fails (or is unavailable);

excluding the detected disc area from the SLO image from layer detection (anatomically, there is no layer there);

converging layers to spots, where RPE boundary anatomically reaches the optic nerve and breaks off; and complying with differences in layer thicknesses in the vicinity of the disc area.

Anatomically, there are no tractions inside the optic disc area, so one can clearly determine the location of Vitreous/RNFL border there. This information can then be used to distinguish tractions from a Vitreous/RNFL layer (both have similar gradients) to improve the analysis results.

These aspects of using the detection of the optic disc in the retina image to guide or assist in the identification of layer detection and identification will now be described with reference to FIG. 2.

Figure 2:
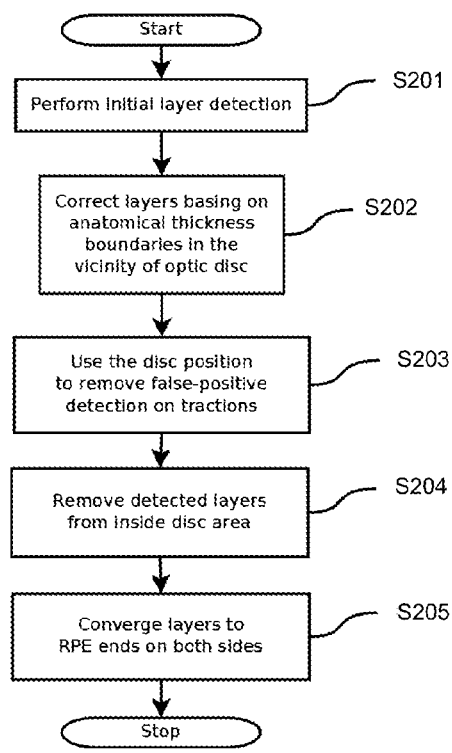
FIG. 2 shows a flow chart of the method for layer analysis with SLO disc detection.

In step S201 of FIG. 2 initial layer detection is performed. This is required before the translated disc position information from the retina image can be utilised to guide the layer detection result in the OCT image. The detection may be performed, for example, by one or more of the following methods:

applying gradient filters to expose brightness differences between layers; and using edge tracking algorithms.

The result of the optic disc detection may be used in the initial detection, such that the algorithm omits the areas, where layer detection cannot be performed reliably.

Sometimes, in the process of initial detection, some layers are detected incorrectly—for instance their detected vertical position may be too low or too high. Due to differing tomogram quality and similarity in layer's brightness's, sometimes a lower layer (as seen on tomogram) may be detected as the higher one. Accordingly, at step 202, the detected layers of the OCT image are corrected basing on anatomical layer thickness in the vicinity of optic disc.

Anatomically, layers usually do not exceed a defined range of thicknesses in different regions of an eye. Information about optic disc may provide a way to correct erroneously detected layers by checking, if the layer fits the appropriate thickness range and making some adjustments, if necessary.

During the detection, sometimes pathologies may be detected as layers. For example, tractions have very similar noise characteristics as the RNFL layer. Therefore, tractions can be incorrectly detected as a RNFL layer, resulting in faulty detection of all remaining layers. However, tractions usually do not exist in the vicinity of the optic disc, so the detected disc position can be used to distinguish the RNFL layer from these pathologies. This property is utilized by using the disc position to remove false-positive detection on tractions in step S203 of the method of FIG. 2.

Figure 4:
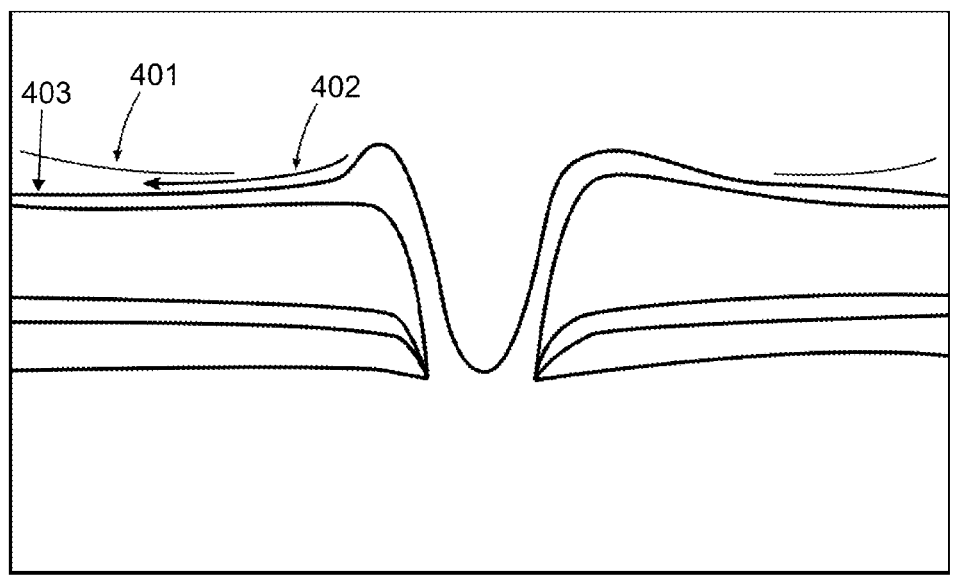
FIG. 4 shows the resulting image after removing, in step 3 from FIG. 2, tractions, falsely detected as layers.

A typical scenario is illustrated in more detail in FIG. 4 which shows a traction 401 which is closely aligned to an RNFL layer 403 which is to be detected. There is a risk that the traction 401 could be misidentified as a portion of the RNFL layer. However, the detected position of the optic disc can be used to determine a tracking path 402 which starts inside the detected disc region and ends at the edges of the tomogram. The algorithm may then try to track the RNFL layer from the detected disc area to the edges of the tomogram, thus avoiding the tractions. Alternatively, it may assign values to detected border fragments to choose the valid layer borders instead of tractions.

Due to human eye anatomy, retina layers do not exist inside the disc area. This property is utilized in step S204. The algorithm may omit this region when detecting layer boundaries in order to avoid false positive detections.

Figure 5:
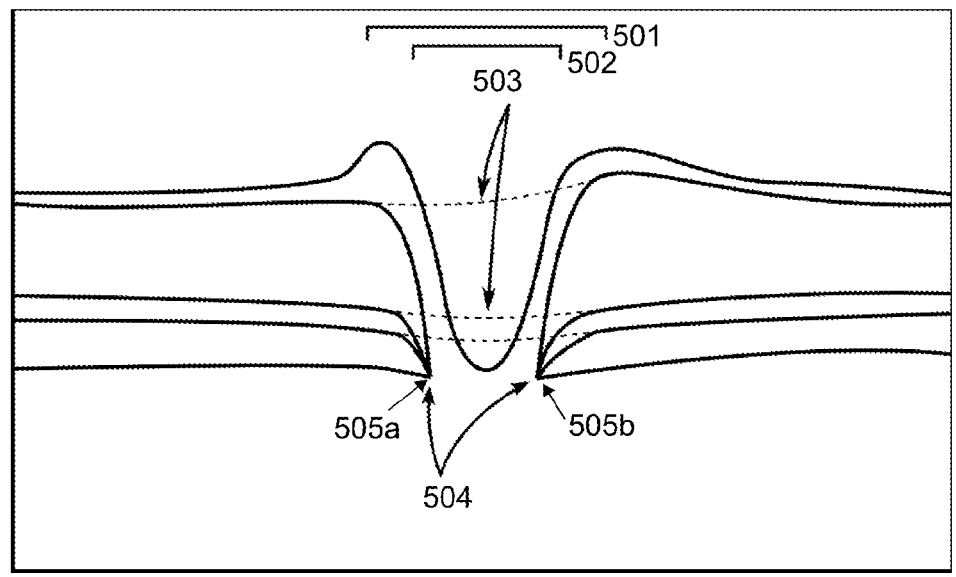
FIG. 5 shows the resulting image after removing detected layers from inside disc area in step 4 from FIG. 2.

This is shown in FIG. 5, in which 502 shows the detected disc area from which detection of the layer boundaries should be omitted.

Due to human eye anatomy, all retina layer borders (except Vitreous/RNFL) converge to the place, where the RPE layer ends around the optic nerve head. Thus, in step S205, information based on the detected optic disc position may be used to make necessary adjustments to adapt the detected layers (other than the RNFL layer) to reflect this known property. For example, the layer boundaries of the non-RNFL layers may be forced to converge to RPE ends on both sides.

This is illustrated in FIG. 5, where the originally detected layer boundaries 503 are shown continuing across the optic disc region 502. The corrected layer boundaries 504 are forced to converge to RPE ends 505a and 505b which are determined based the detected optic disc area 502 so that there is an converging region 501 where the non-RNFL boundaries are forced to converge.

In a further embodiment, the shape of the SLO disc polygon can be used to evaluate scaling ratios for an OCT projection image. The OCT projection image can then be used to detect the optic disc. After detection, there is a high probability that the disc on the OCT image will have a circular shape, which in effect simplifies the detection process.

The embodiments presented above refer to OCT imaging of an eye, however, it is to be understood that the invention is also applicable to imaging of other objects having a similarly well-defined shape and structure. For example, fingers and toes, or any other subjects comprising layered matter or tissue. Also, as well as layer detection, any other features visible on an image object can be subject to the advantageous methods described herein.

Although various embodiments that incorporate the teachings of the present invention have been described, those skilled in the art can readily devise many other varied embodiments that still incorporate these teachings.

It will be appreciated that methods embodying the present invention may be computer-implemented methods. Thus, the present invention extends to a program which, when executed by a computer or processor, causes the computer or processor to carry out any of the methods described hereinbefore.

Such a program may be provided by itself or may be carried in, by or on a carrier medium. The carrier medium may be a storage medium or recording medium, in particular a computer-readable storage medium. Examples include a hard disk drive, DVD, or memory device.

The carrier medium may also be a transmission medium such as a signal. Thus, a program embodying the present invention may be distributed, downloaded or uploaded in the form of a signal through a network including the Internet.

The program may be non-transitory.

The invention claimed is:

1. A method for processing a tomography image, the method comprising:
   identifying an optic disc in a tomography image;
   detecting a plurality of layer boundaries of retina layers in the tomography image, wherein the plurality of layer boundaries include a boundary between a Vitreous and a Retina Nerve Fiber Layer; and
   in the tomography image, converging the detected layer boundaries, except the detected boundary between the Vitreous and the Retina Nerve Fiber Layer, to an end of a Retina Pigment Epithelium layer around the identified optic disc.

2. An image processing method comprising:
   identifying an optic disc in a tomography image using a processor;
   detecting a plurality of layer boundaries of retina layers in the tomography image using the processor, wherein the plurality of layer boundaries include a boundary between a Vitreous and a Retina Nerve Fiber Layer; and
   correcting, using the processor, the layer boundaries, except the boundary between the Vitreous and the Retina Nerve Fiber Layer, detected in the detecting, in such a way as to converge the layer boundaries, except the detected boundary between the Vitreous and the Retina Nerve Fiber Layer, to a position near the optic disc in a predetermined layer included in the tomography image.

3. The image processing method according to claim 2, wherein the position near the optic disc in the predetermined layer is an end position of the predetermined layer.

4. The image processing method according to claim 3, wherein the end position of the predetermined layer is determined based on the position of the optic disc.

5. The image processing method according to claim 2, wherein the predetermined layer is a Retina Pigment Epithelium layer.

6. The image processing method according to claim 2, wherein detecting includes detecting the layer boundaries in the tomography image based on the position of the optic disc.

7. The image processing method according to claim 6, wherein detecting includes detecting the layer boundaries by analyzing the tomography image along a direction away from the position of the optic disc in a direction orthogonal to a depth direction of the tomography image.

8. The image processing method according to claim 2, wherein, in the identifying, the processor identifies the optic disc in a fundus image, and identifies the optic disc in the tomography image based on a position of the optic disc in the fundus image.

9. The image processing method according to claim 8, wherein identifying includes determining a range of area in the tomography image, which is subjected to image analysis performed to identify the optic disc in the tomography image based on the position of the optic disc in the fundus image.

10. An image processing apparatus comprising:
    at least one processor coupled to a memory;
    an identification unit configured to identify an optic disc in a tomography image;
    a boundary detection unit configured to detect a plurality of layer boundaries of retina layers in the tomography image, wherein the plurality of layer boundaries include a boundary between a Vitreous and a Retina Nerve Fiber Layer; and
    a correction unit configured to correct the layer boundaries, except the boundary between the Vitreous and the Retina Nerve Fiber Layer, detected by the boundary detection unit, in such a way as to converge the layer boundaries, except the detected boundary between the Vitreous and the Retina Nerve Fiber Layer, to a position of the optic disc,
    wherein the identification unit, the boundary detection unit, and the correction unit are implemented by the at least one processor.

11. An image processing apparatus comprising:
    at least one processor coupled to a memory;
    an identification unit configured to identify an optic disc in a tomography image; and
    a boundary detection unit configured to detect a layer boundary by analyzing the tomography image along a direction away from a position of the optic disc in a direction orthogonal to a depth direction of the tomography image,
    wherein the identification unit and the boundary detection unit are implemented by the at least one processor.

12. An image processing method comprising:
    detecting a plurality of layer boundaries in a tomography image using a processor wherein the plurality of layer boundaries include a boundary between a Vitreous and a Retina Nerve Fiber Layer; and
    correcting the plurality of layer boundaries, except the boundary between the Vitreous and the Retina Nerve Fiber Layer, detected in the detecting, in such a manner that ends of the plurality of layer boundaries, except the detected boundary between the Vitreous and the Retina Nerve Fiber Layer, are aligned more closely to one another near the optic disc.

13. An image processing method comprising:
    identifying an optic disc in a tomography image using a processor;
    detecting a plurality of layer boundaries of retina layers in the tomography image using the processor, wherein the plurality of layer boundaries include a boundary between a Vitreous and a Retina Nerve Fiber Layer; and
    correcting, using the processor, layer boundaries, except the boundary between the Vitreous and the Retina Nerve Fiber Layer, detected in the detecting, in such a way as to converge the layer boundaries, except the detected boundary between the Vitreous and the Retina Nerve Fiber Layer, to an end of a predetermined layer.

14. The image processing method according to claim 13, wherein the predetermined layer is a Retina Pigment Epithelium layer.

15. An image processing method comprising:
 identifying an optic disc in a tomography image using a processor;
 detecting a plurality of layer boundaries of retina layers in the tomography image using a processor, wherein the plurality of layer boundaries include a boundary between a Vitreous and a Retina Nerve Fiber Layer; and
 correcting, using a processor, the layer boundaries, except the boundary between the Vitreous and the Retina Nerve Fiber Layer, detected in the detecting, based on a position of the optic disc.

16. The image processing method according to claim 15, wherein, in the identifying, the processor identifies the optic disc in a fundus image, and identifies the optic disc in the tomography image based on a position of the optic disc in the fundus image.

17. The image processing method according to claim 16, wherein identifying includes determining a range of area in the tomography image, which is subjected to image analysis performed to identify the optic disc in the tomography image based on the position of the optic disc in the fundus image.

18. An image processing method comprising:
 identifying a region representing an optic disc in a tomography image using a processor;
 detecting a plurality of layer boundaries of retina layers in the tomography image using a processor, wherein the plurality of layer boundaries are located different positions in a depth direction of the tomography image; and
 correcting, using a processor, the layer boundaries detected in the detecting based on a position of the region representing the optic disc identified in the identifying.

19. The image processing method according to claim 18, wherein, in the identifying, the processor identifies a region representing the optic disc in a fundus image, and identifies the region representing the optic disc in the tomography image based on a position of the region representing the optic disc in the fundus image.

20. The image processing method according to claim 19, wherein identifying includes determining a range of area in the tomography image, which is subjected to image analysis performed to identify the region representing the optic disc in the tomography image based on the position of the region representing the optic disc in the fundus image.

* * * * *